United States Patent
Cook

(10) Patent No.: US 10,742,950 B2
(45) Date of Patent: Aug. 11, 2020

(54) COLLECTING AND PROCESSING STEREOSCOPIC DIGITAL IMAGE DATA TO PRODUCE A PARALLAX CORRECTED TILTED HEAD VIEW

(71) Applicant: Nvidia Corporation, Santa Clara, CA (US)

(72) Inventor: David Cook, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 945 days.

(21) Appl. No.: 15/043,718

(22) Filed: Feb. 15, 2016

(65) Prior Publication Data

US 2017/0237963 A1    Aug. 17, 2017

(51) Int. Cl.
| | |
|---|---|
| *H04N 13/117* | (2018.01) |
| *H04N 13/271* | (2018.01) |
| *H04N 13/344* | (2018.01) |
| *H04N 13/378* | (2018.01) |
| *H04N 13/122* | (2018.01) |
| *H04N 13/243* | (2018.01) |
| *G02B 27/01* | (2006.01) |
| *H04N 13/218* | (2018.05) |
| *H04N 13/00* | (2018.01) |

(52) U.S. Cl.
CPC ......... *H04N 13/117* (2018.05); *H04N 13/122* (2018.05); *H04N 13/243* (2018.05); *H04N 13/271* (2018.05); *H04N 13/344* (2018.05); *H04N 13/378* (2018.05); *G02B 27/017* (2013.01); *G02B 2027/0134* (2013.01); *H04N 13/218* (2018.05); *H04N 2013/0081* (2013.01)

(58) Field of Classification Search
CPC .................................................... H04N 13/117
USPC .......................................................... 348/49
See application file for complete search history.

(56) References Cited

U.S. PATENT DOCUMENTS

| | | | |
|---|---|---|---|
| 2006/0187312 A1* | 8/2006 | Labaziewicz | H04N 5/225 348/218.1 |
| 2013/0342650 A1* | 12/2013 | Shaw | H04N 5/2254 348/46 |
| 2015/0055937 A1* | 2/2015 | Van Hoff | H04N 13/243 13/243 |

* cited by examiner

*Primary Examiner* — Eileen M Adams
*Assistant Examiner* — Daniel T Tekle

(57) ABSTRACT

An apparatus for capturing digital stereoscopic images of a scene. The apparatus comprises a first pair of separated camera lens oriented such that a first imaginary line between the first pair of lens is substantially parallel with a horizon line a scene, wherein digital image data is capturable through the first pair of camera lens and storable in two separate digital image data bases corresponding to a left-eye horizontal view and a right-eye horizontal view respectively. The apparatus comprises a second pair of separated camera lens oriented such that a second imaginary line between the second pair of lens is substantially non-parallel with the horizon line, wherein digital image data is capturable through the second pair of camera lens and storable in two separate digital image data bases corresponding to a left-eye off-horizontal view and a right-eye off-horizontal view respectively.

20 Claims, 7 Drawing Sheets

Figure 1:
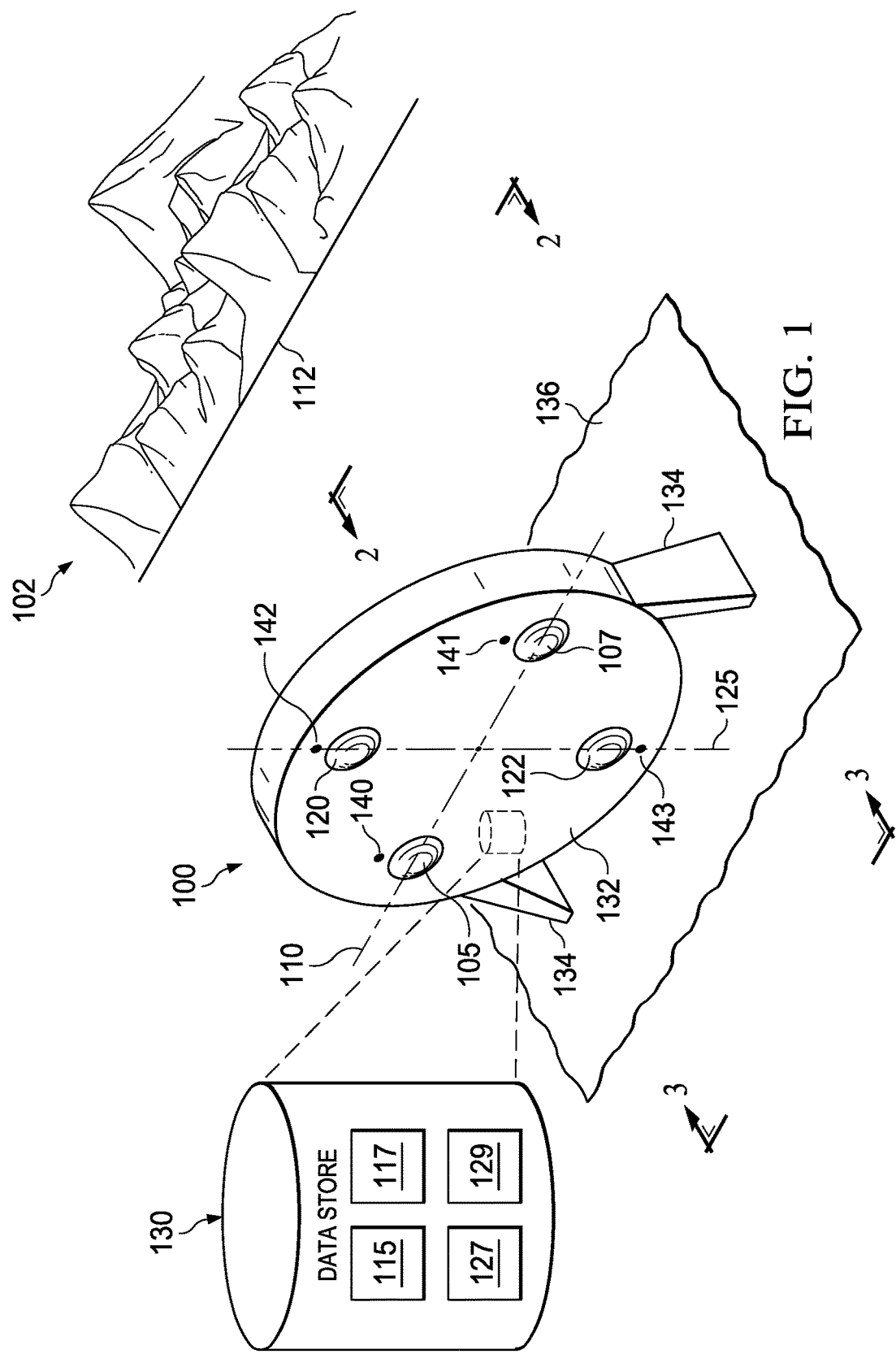

COLLECTING AND PROCESSING STEREOSCOPIC DIGITAL IMAGE DATA TO PRODUCE A PARALLAX CORRECTED TILTED HEAD VIEW

TECHNICAL FIELD

This application is directed, in general, to capturing and processing digital stereoscopic images, and more particularly, to collecting images that allow the production of a corrected tilted head view of such images.

BACKGROUND

A growing interest in the field of virtual reality is how to capture and display stereoscopic images, including movies, such that the viewer can move their head and see a 360 degree environment from the image. An unmet need is for a viewer of the virtual reality image to be able to tilt their head and still see a realist stereoscopic view of the image.

SUMMARY

One aspect of the invention provides an apparatus for capturing digital stereoscopic images of a scene. The apparatus comprises a first pair of separated camera lens oriented such that a first imaginary line between the first pair of lens is substantially parallel with a horizon line a scene. The digital image data is capturable through the first pair of camera lens and storable in two separate digital image data bases corresponding to a left-eye horizontal view and a right-eye horizontal view respectively. The apparatus comprises a second pair of separated camera lens oriented such that a second imaginary line between the second pair of lens is substantially non-parallel with the horizon line. The digital image data is capturable through the second pair of camera lens and storable in two separate digital image data bases corresponding to a left-eye off-horizontal view and a right-eye off-horizontal view respectively.

Another aspect provides a method of processing stereoscopic digital images of a scene, for presentation on a head mounted stereoscopic display unit. The method comprises loading, from a data store of an electronic computing device, separate digital image data bases of images corresponding to a first pair of left-eye and right-eye horizontal views, and a second pair of left-eye and right-eye off-horizontal views. The method also comprises selecting, in an electronic processing unit of the electronic computing device, a blend of pixels from the first pair of left-eye and right-eye horizontal views and the second pair of left-eye and right-eye off-horizontal views, wherein the blend is proportionate to a tilt angle of the head mounted stereoscopic display unit. The method further comprises morphing, in the electronic processing unit, the blend of the pixels of the left-eye horizontal view with the pixels of the left-eye off-horizontal view to produce a left-eye image for presentation on a left screen side of the head mounted stereoscopic display unit, and, morphing the blend of the pixels of the right-eye horizontal view with the pixels of the right-eye off-horizontal view to produce a right-eye image for presentation on a right screen side of the head mounted stereoscopic display unit.

Another aspect is an electronic computing image processing system for processing stereoscopic digital images of a scene. The system comprises an electronic computing device, the electronic computing device including a data store and graphical processing and central processing units. The data store is configured to hold separate digital image data bases of images corresponding to a first pair of left-eye and right-eye horizontal views, and a second pair of left-eye and right-eye off-horizontal views. The processing units are configured to select a blend of pixels from the first pair of left-eye and right-eye horizontal views and the second pair of left-eye and right-eye off-horizontal views, wherein the blend is proportionate to a tilt angle of a head mounted stereoscopic display unit. The processing units are also configured to morph the blend of the pixels of the left-eye horizontal view with the pixels of the left-eye off-horizontal view to produce a left-eye image for presentation on a left screen side of the head mounted stereoscopic display unit, and, morph the blend of the pixels of the right-eye horizontal view with the pixels of the right-eye off-horizontal view to produce a right-eye image for presentation on a right screen side of the head mounted stereoscopic display unit.

BRIEF DESCRIPTION

Figure 2:
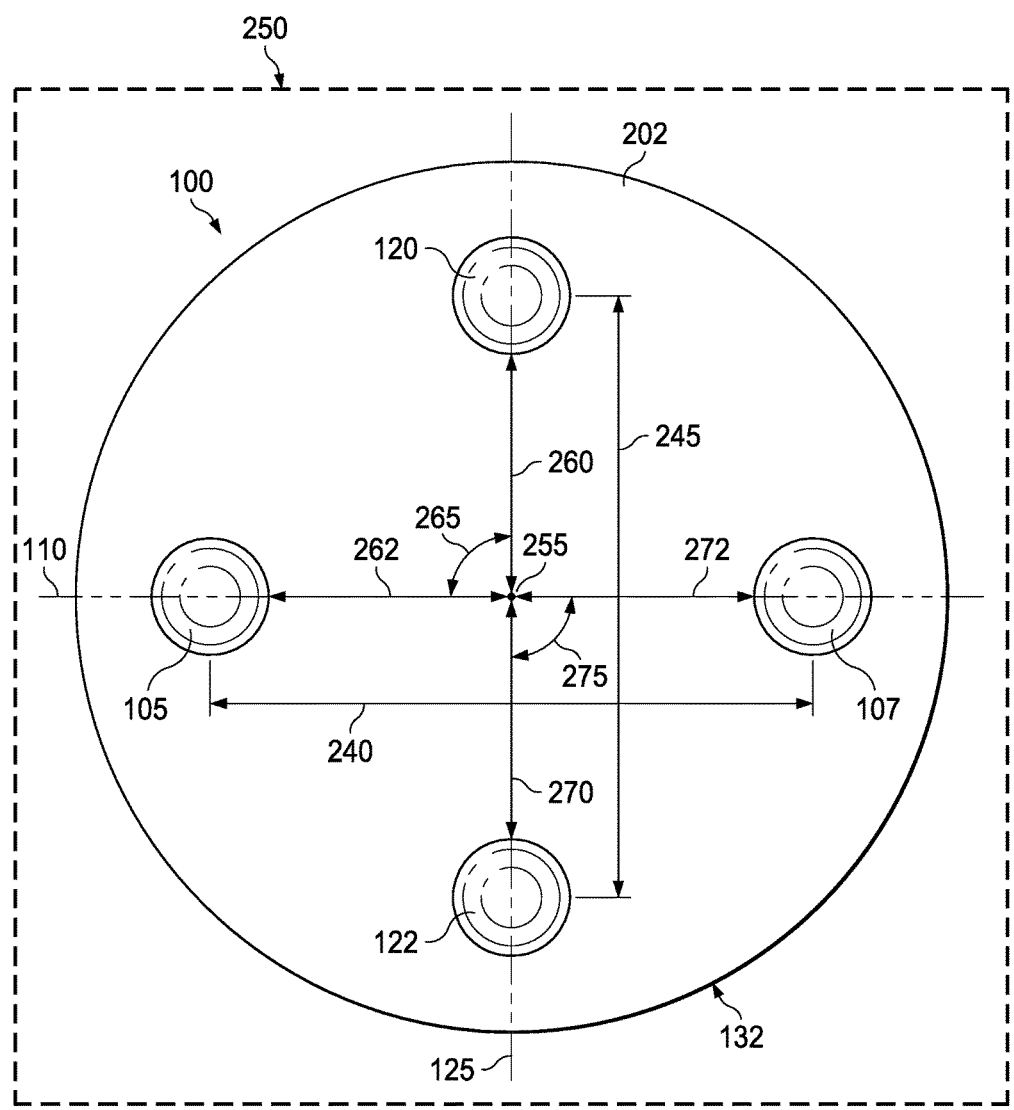
Figure 3:
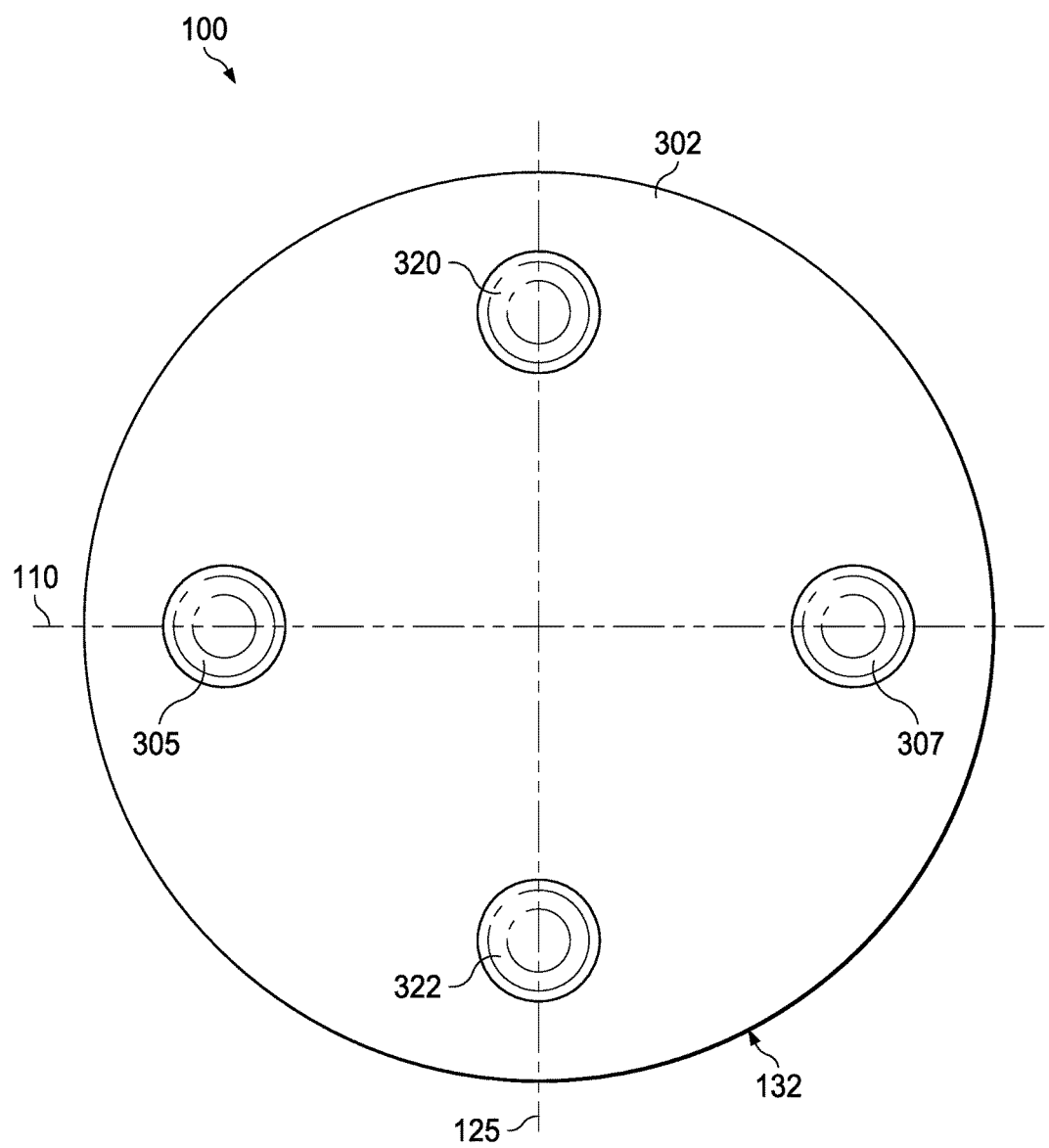
Figure 4:
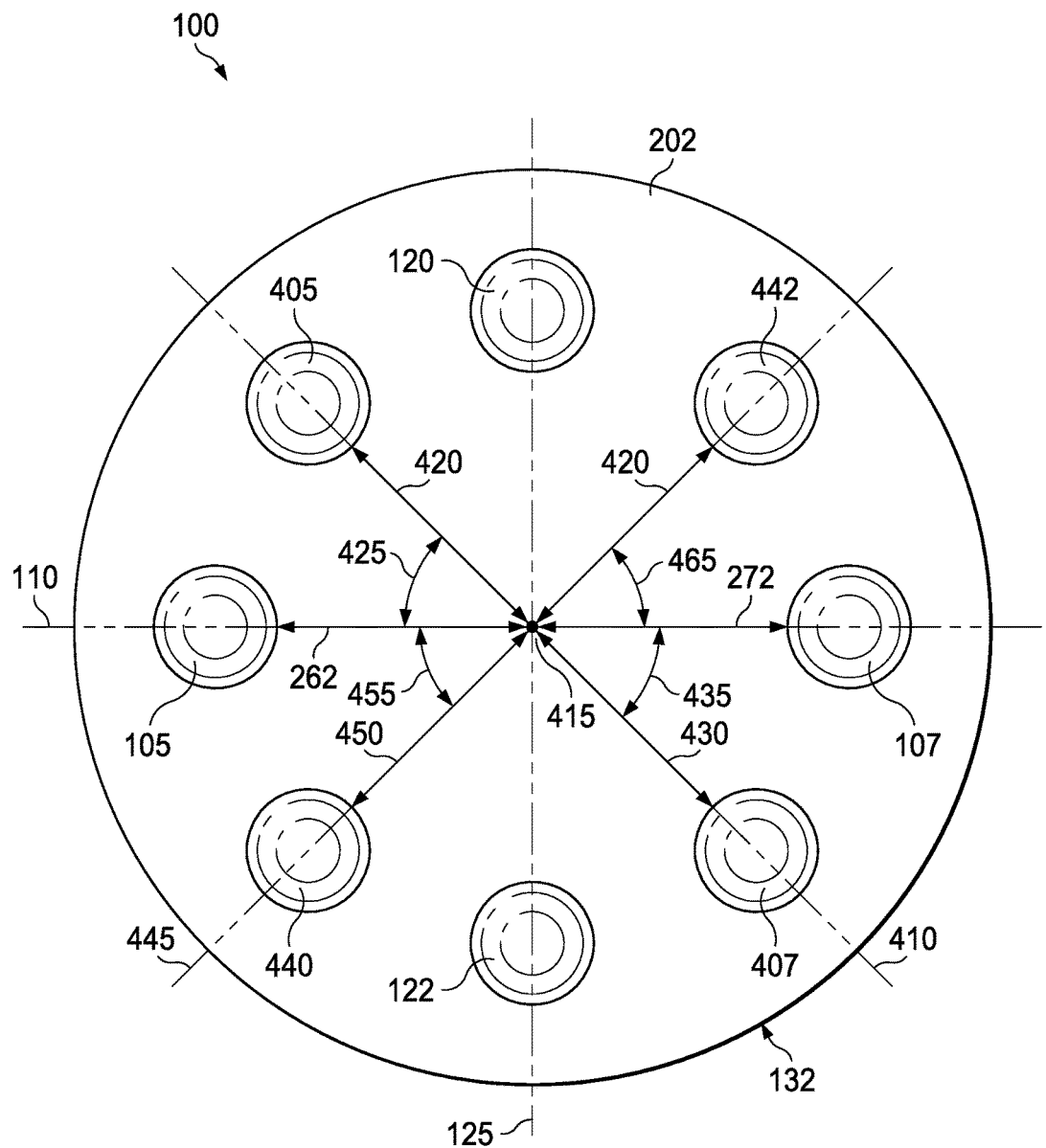
Figure 5:
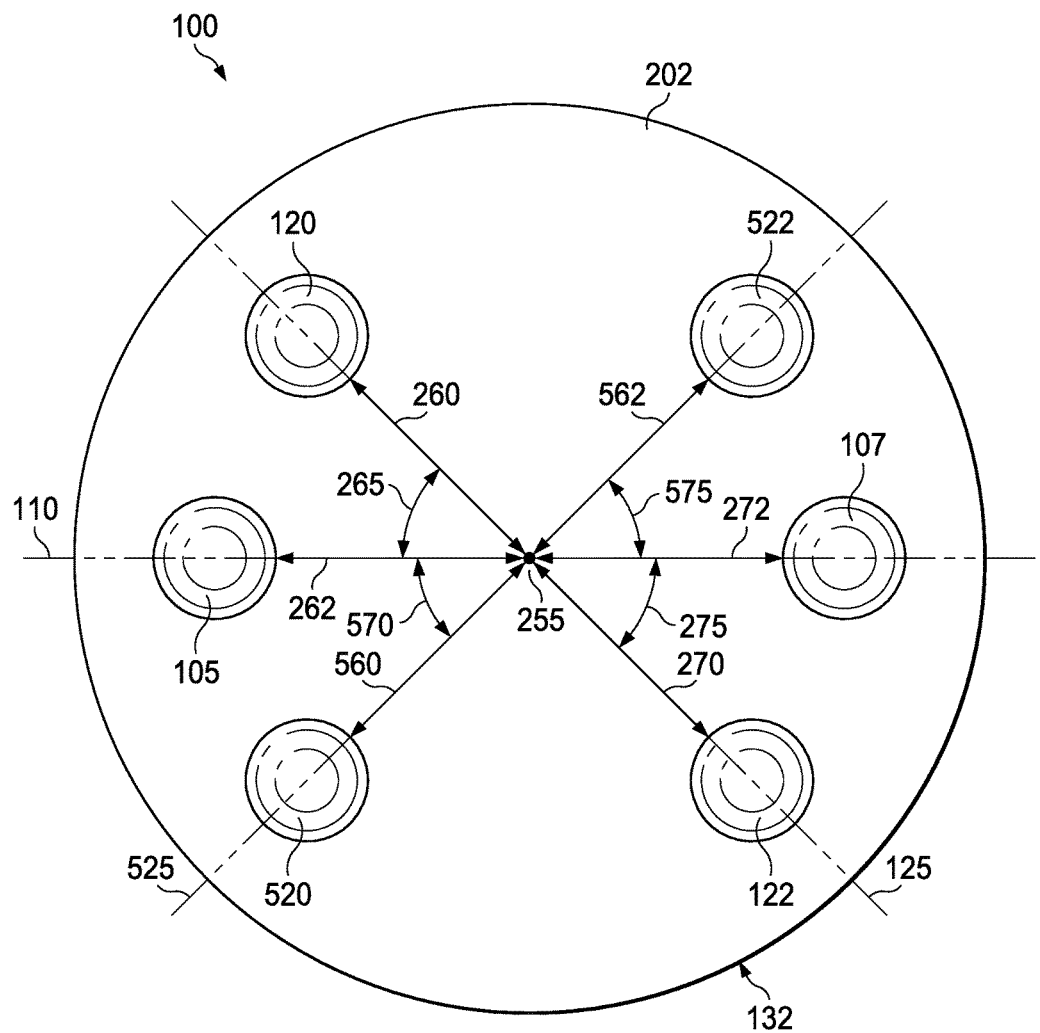
Figure 6:
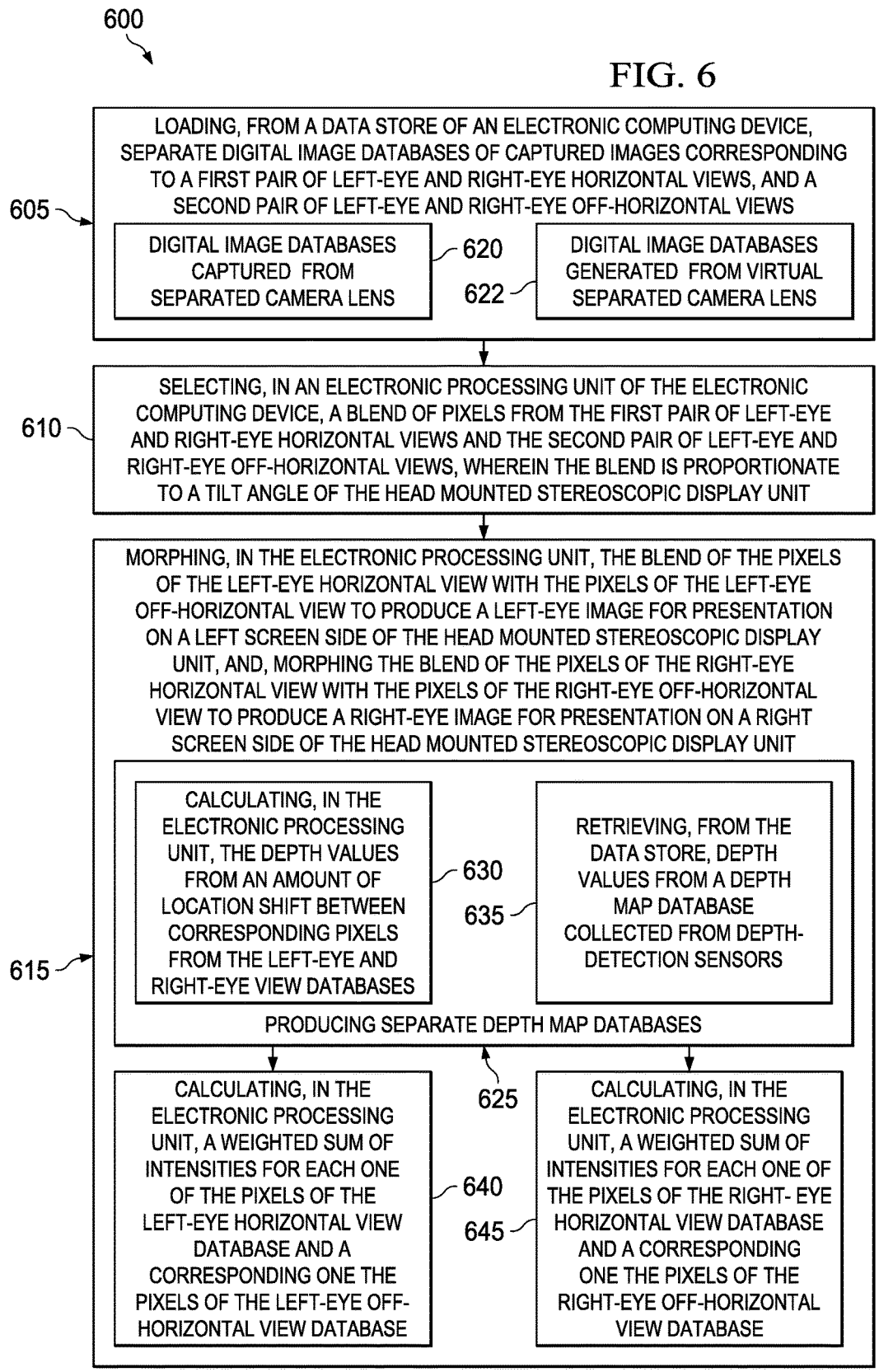
Figure 7:
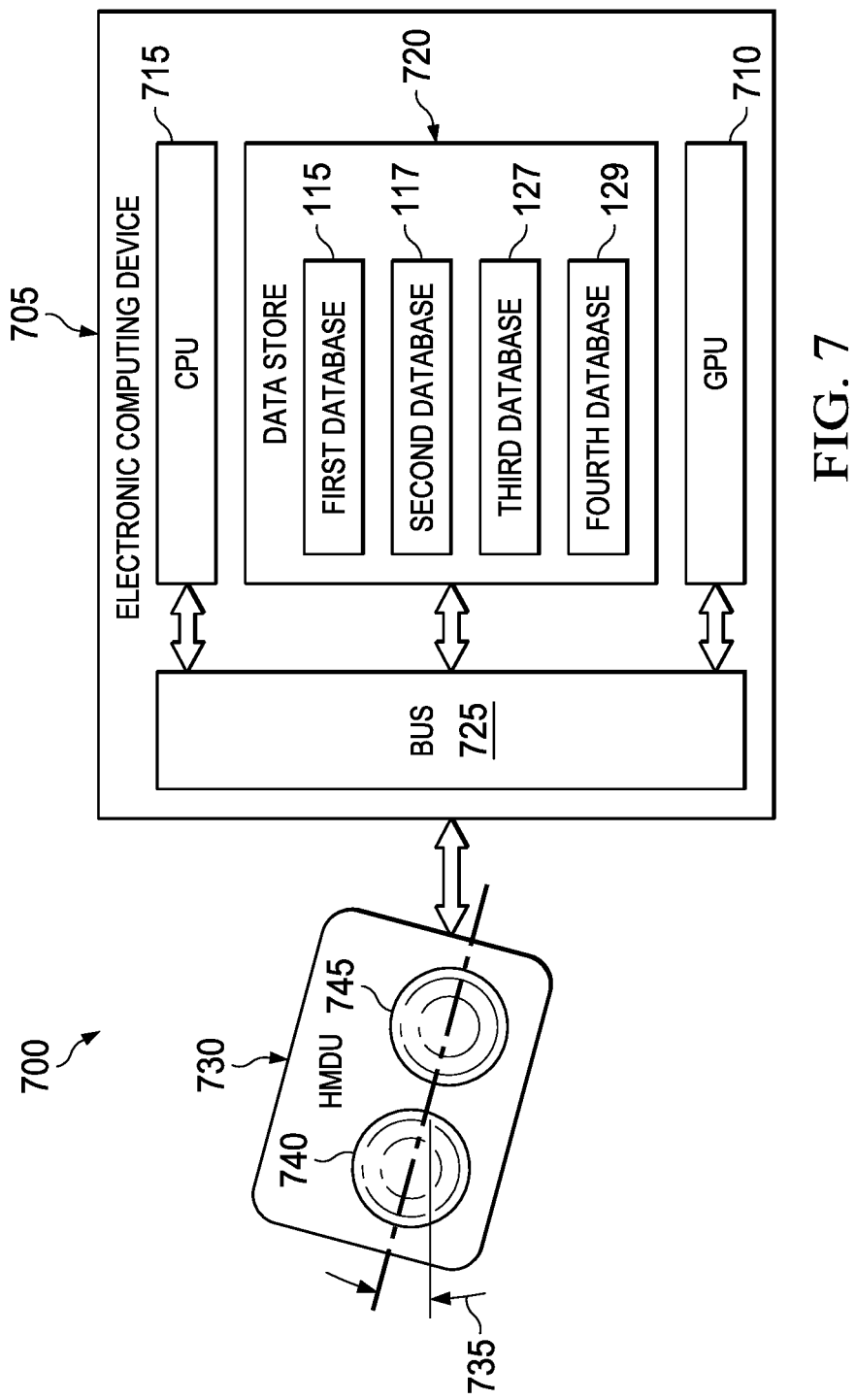

Reference is now made to the following descriptions taken in conjunction with the accompanying drawings, in which:

FIG. 1 presents a perspective view of an embodiment of an apparatus of the present invention for capturing stereoscopic images of a scene;

FIG. 2 presents a front-side view of the apparatus presented in FIG. 1 along view line 2-2 as shown in FIG. 1;

FIG. 3 presents a back-side view of the apparatus presented in FIG. 1 along view line 3-3 as shown in FIG. 1;

FIG. 4 presents a front-side view of an alternative embodiment of the apparatus, the front-side view analogous to that depicted in FIG. 2;

FIG. 5 presents a front-side view of another alternative embodiment of the apparatus, the front-side view analogous to that depicted in FIG. 2;

FIG. 6 presents a flow diagram of example embodiments of a method for processing image data, such data collectable by any of the apparatus embodiments depicted in FIGS. 1-5, according to the principle of the present invention; and FIG. 7 presents a block diagram of an example electronic computing system for processing image data according to any of the embodiments of the method such as described in the context of FIG. 6.

DETAILED DESCRIPTION

To view digitally captured virtual reality stereoscopic images (e.g., fixed images or movies) of a scene, a person typically wears a head-mounted display unit. The head-mounted display unit can provide a 360 degree view of the captured image of the scene as the person rotates their head around. If, however, the person tilts their head, and head-mounted display unit, to the left or right, then the image display may become distorted to such an extent that the stereoscopic viewing effect is lost. The distortion can be so bad that the person may have trouble continuing to view the image. Consequently, the realism of the viewing experience is detracted from because the viewer has to keep their head straight to avoid these distortions.

As part of the present invention, the inventor has recognized that such distortions are due to a failure of present methods to produce stereoscopic images to reproduce the parallax experience of human vision when a viewer tilts their head.

Parallax refers to the difference in the apparent position of an object viewed along two different lines of sight, such as from the left eyes versus the right eye. For example, consider a person sitting or standing upright while looking at a scene in reality with both eyes such that an imaginary line between the eyes is parallel to a horizon line in the scene. The different views experienced by each eye of the person will correspond to a parallax between eyes that is substantially horizontal. If, however, the person then tilts their head sideways while looking at the same scene, such that the line between the eyes is perpendicular to the horizon line in the scene, then different views experienced by each eye will be of a parallax between eyes that is substantially vertical. If the person views the scene with their head partially tilted by less than a perpendicular amount, then different views experienced by the eyes will be of a parallax that is intermediate between horizontal and vertical parallax effects.

Existing stereoscopic image processing methods fail to provide proper left and right eye views when a viewer's head, and head-mounted display unit, is tilted because the vertical parallax experience is either not collected as part of the captured image data and/or the method does not consider such data when producing images as the viewer tilts their head while wearing a head-mounted display unit to view the image.

This invention addresses such deficiencies by providing an apparatus that is constructed to capture stereoscopic image data for each eye, corresponding to a horizontal zero-degree-angled un-tilted orientation, and, to off-horizontal non-zero-degree-angled tilted orientations of the eyes, relative to a horizon in a scene. This invention further addresses such deficiencies by providing a method of processing such captured data such that the rendered images sent to either eye has a blend of horizontal and off-horizontal parallax effects to account for the depth of object in the image and the extent to which a viewer's head is tilted while viewing the image.

FIG. 1 presents a perspective view of an embodiment of an apparatus 100 of the present invention for capturing stereoscopic digital images of a scene. As illustrated in FIG. 1, the apparatus 100 is positioned to collect image data from a scene 102 (e.g., an outdoor scene or indoor interior scene).

With continuing reference to FIG. 1 throughout, the apparatus 100 comprises a first pair of separated camera lens 105, 107 oriented such that a first imaginary line 110 between the first pair of lens 105, 107 is substantially parallel with a horizon line 112 of the scene 102. The digital image data is capturable through the first pair of camera lens 105, 107 and storable in two separate digital image data bases 115, 117 corresponding to a left-eye horizontal view and a right-eye horizontal view, respectively.

The apparatus 100 also comprises a second pair of separated camera lens 120, 122 oriented such that a second imaginary line 125 between the second pair of lens 120, 122 is substantially non-parallel with the horizon line 112. The digital image data is capturable through the second pair of camera lens 120, 122 and storable in two separate digital image data bases 127, 129 corresponding to a left-eye off-horizontal view and a right-eye off-horizontal view, respectively.

One skilled in the pertinent arts would understand how the pixels of a digital image could be stored in a digital image data base, e.g., as binary data, e.g., in bitmap or pixmap formats in a data store 130. In some embodiments, the data store 130 can be part of the apparatus 100 while in other embodiments the data store 130 can be located remotely from the apparatus 100. Non-limiting examples of data stores include random access memory (RAM) hard disk drives, solid state drives, removable storage drives, such as floppy disk drives, magnetic tape drives, or a compact disk drives or other storage familiar to those skilled in the pertinent arts. One skilled in the art would understand how such binary data could be communicated over a computer network (e.g. a cloud network) via a transmission control protocol/internet protocol, or similar protocols, to a remotely located data store.

As further illustrated in FIG. 1 embodiments of the apparatus 100 can further include a casing 132 to mount the lens 105, 107, 120, 122 and, in some embodiment, the data store 130 therein. Some embodiments of the apparatus 100 can further include legs 134 to support the casing 132 thereon, e.g., in a perpendicular orientation relative the surface 136 (e.g., the ground or a floor) that the apparatus is located on).

FIG. 2 presents a front-side view 202 of the apparatus 100 presented in FIG. 1 along view line 2-2 as shown in FIG. 1, and, FIG. 3 presents a back-side 302 view of the apparatus 100 presented in FIG. 1 along view line 3-3 as shown in FIG. 1.

As illustrated in FIGS. 2 and 3, embodiments of the apparatus 100 can have both front-side 202 first and second pairs of camera lens 105, 107, 120, 122 and correspondingly located back-side 302 first and second pairs of camera lens 305, 307, 320, 322. In some embodiments each of the back-side 302 camera lens 305, 307, 320, 322 can be configured to capture 180 degree, or near 180 degree, field-of-view images of a scene (not shown) facing the back-side 302 of the apparatus 100, and, the front-side 202 lens 105, 107, 120, 122 can be configured to capture similar field-of-view images of the scene 102 facing the front-side 202 of the apparatus 100. In other embodiments, one or all of the individual front- and back-side 202, 302 camera lens 105, 107, 120, 122, 305, 307, 320, 322 can be replaced with a plurality of camera lens, e.g., to facilitate capturing images with a field-of-view equal to 180 degrees, or nearly 180 degrees.

Although subsequent embodiments of the apparatus 100 are described in the context of the front-side 202 camera lens 105, 107, 120, 122 or additional camera lens on the front-side 202, any of these embodiments would be equally applicable to the back-side 302 camera lens 305, 307, 320, 322 or additional lens on the back-side 302. Images captured from the back-side 302 camera lens would be stored in separate digital image data bases analogous to that described for the front-side 202 camera lens.

As further illustrated in FIG. 2, in some embodiments, to mitigate the computational burden of processing the captured images in the data bases 115, 117, 127, 129, and as part of accounting for horizontal and off-horizontal parallax effects, the first pair of separated camera lens 105, 107 are separated from each other along the first line 110 by a fixed distance 240 and the second pair of separated camera lens 120, 122 are separated from each other along the second line by a same fixed distance 245. For instance, in some embodiments it may be desirable for the fixed separations distances 240, 245 to both be equal to an average human interpupillary distance. For instance, in some embodiments, the fixed separations distances 240, 245 are a same distance value in a range from about 50 to 80 mm, and in some embodiments, from about 60 mm to 70 mm.

As further illustrated in FIG. 2, in some embodiments, to mitigate the computational burden of processing the captured images in the data bases 115, 117, 127, 129, as part of accounting for horizontal and off-horizontal parallax effects, the first pair of separated camera lens and the second pair of separated camera lens are located in a same plane 250 that is substantially perpendicular to the horizon line 112.

As further illustrated in FIG. 2, in some embodiments, to mitigate the computational burden of processing the captured images in the data bases 115, 117, 127, 129, as part of accounting for horizontal and off-horizontal parallax effects, e.g., over a full head tilt range up to a perpendicular tilt, the first line 110 and the second line pass 125 through a common center point 255 and the second line 125 is substantially perpendicular to the first line 110.

As illustrated in FIG. 2, in some embodiments, a first segment 260 of the second line 125 is located between one of the second pair of lens (e.g., lens 120) and a center point 255 of the second line 125, and, a first segment 262 of the first line is located between one of the first pair of lens (e.g., lens 105) and a center point 255 of the first line 110. In some such embodiments, the first segment 260 of the second line 125 forms an off-horizontal angle 265 of about +90 degrees with the first segment 262 of the first line 110.

In some embodiments, a second segment 270 of the second line 125 is located between the other one of the second pair of lens (e.g., lens 122) and the center point 255 of the second line 125, and, a second segment 272 of the first line 110 is located between the other one of the first pair of lens (e.g., lens 107) and the center point 255 of the first line 110. In some such embodiments, the second segment 270 of the second line 125 forms another off-horizontal angle 275 of about −90 degrees with the second segment 272 of the first line 110.

In some embodiments, to provide more image data that may more accurately account for off-horizontal parallax effects, additional separate pairs of camera lens can be positioned at different locations on the front-side 202 or back-side 302. For instance, FIG. 4 presents a front-side view of such an alternative embodiment of the apparatus 100, analogous to the front-side view 202—depicted in FIG. 2.

As illustrated in FIG. 4, the apparatus 100 can further include a third pair of separated camera lens 405, 407 oriented such that a third imaginary line 410 between the third pair of lens 405, 407 is substantially non-parallel with the first line 110 and the second line 125. In some such embodiments, the first line 110, second line 125 and the third line 410 can pass through a common center point 415. As described in the context of FIG. 2, a first segment 260 of the second line 125 located between one of the second pair of lens 120 and the center point 415, forms an about 90 degree off-horizontal angle 263 with a first segment 262 of the first line 110 located between one of the first pair of lens 105 and the center point 415. Additionally, a first segment 420 of the third line 410 located between one of the third pair of lens (e.g., lens 405) and the center point 415, forms an about 45 degree off-horizontal angle 425 with the same first segment 262 of the first line 110. Similarly, a second segment 270 of the second line 125 can form an about −90 degree off-horizontal angle 275 with a second segment 272 of the first line 110 and a second segment 430 of the third line 410 forms an about −45 degree off-horizontal angle 435 with the same second segment 272 of the first line 110.

As further illustrated in FIG. 4, the apparatus 100 can also include a fourth pair of separated camera lens 440, 442 oriented such that a fourth imaginary line 445 between the fourth pair of lens 440, 442 is substantially non-parallel with the first line 110, the second line 125 and the third line 410.

In some such embodiments, as described in the context of FIG. 2 and FIG. 4 above, the first line 110, second line 125, the third line 410 and the fourth line 445 can all pass through the common center point 415, the first segment 260 of the second line 125 can form the about 90 degree off-horizontal angle 263 with a first segment 262 of the first line 110, and the first segment 420 of the third line 410 can form the about 45 degree off-horizontal angle 425 with the same first segment 262 of the first line 110. Additionally, a first segment 450 of the fourth line 445 located between one of the fourth pair of lens (e.g., lens 440) and the center point 415, can form an about −45 degree off-horizontal angle 455 with the same first segment 262 of the first line 110. Similarly, a second segment 460 of the fourth line 445 can form an about +45 degree off-horizontal angle 465 with the same second segment 272 of the first line 110.

In some embodiments, to provide image data that can more accurately account for off-horizontal parallax effects, the second pair separated camera lens 120, 122 can be oriented such that a second imaginary line between the second pair of lens forms a non-parallel line that is commensurate with a viewer's expected maximum head tilt, which, e.g., may be of substantially less than +90 or −90 degrees. FIG. 5 presents a front-side view of such an embodiment of the apparatus 100, the front-side view analogous to that depicted in FIG. 2. Similar to that described in the context of FIG. 2, the first segment 260 of the second line 125 can be located between one of the second pair of lens 120 and a center point 255 of the second line 125, and, a first segment 262 of the first line 110 can be located between one of the first pair of lens 105 and a center point 255 of the first line 110. In some such embodiments, the first segment 260 of the second line 125 can form an off-horizontal angle 265 with the first segment 262 of the first line 110, the off-horizontal angle 265 in a range, e.g., from about +20 to +70 degrees, and in some embodiments, from about +35 to +55 degrees. The angle 265 can be selected to correspond to a maximum expected head tilt angle. For instance, as illustrated in FIG. 5, for a maximum expected head tilt angle of about 45 degrees, the second pair of lens 120, 122 can be positioned such that the off-horizontal angle 265 equals about +45 degrees. Similarly, the second segment 270 of the second line 125 can form another off-horizontal angle 275 with the second segment 272 of the first line 110, the other off-horizontal angle in a complementary same corresponding range from about −20 to −70 degrees.

In such embodiments, the second pairs of lens 120, 122 can be used to account off-horizontal parallax effects experienced by the left eye for head tilt angles to the same off-horizontal angle 265 ranges as described above.

Additionally, to account for off-horizontal parallax effects experienced by the right eye, the apparatus 100 can further include a third pair of lens 520, 522, e.g., oriented such that a third imaginary line 525 between the third pair of lens 520, 522 is substantially non-parallel with the first line 110 and the second line 125 and passing through the same center point 255.

Analogous to that described above, a first segment 560 of the third line 525 can be located between one of the third pair of lens 520 and the center point 255 of the third line 525. In some such embodiments, the first segment 560 of the third line 525 can form an off-horizontal angle 570 with the first segment 262 of the first line 110, the off-horizontal angle 570 in a range, e.g., from about −20 to −70 degrees, and in some embodiments, from about −35 to −55 degrees. For instance, as illustrated in FIG. 5, for a maximum head tilt angle of about 45 degrees, the third pair of lens 520, 522 can be positioned such that the off-horizontal angle 570 equals about −45 degrees. Similarly, the second segment 562 of the third line 525 can form another off-horizontal angle 575 with the second segment 272 of the first line 110, the other off-horizontal angle 575 in a complementary same corresponding range from about +20 to +70 degrees.

As further illustrated in FIG. 1, to facilitate a more accurate accounting of horizontal and off-horizontal parallax effects when processing the image data bases 115, 117, 127, 129, some embodiments of the apparatus 100 can further include separate depth-detection sensors 140, 141, 142, 143, each of the sensors near one of the camera lens of the first and second pairs of separated camera lens 105, 107, 120, 122. The separate depth-detection sensors 140, 141, 142 143 are configured to collect depth values corresponding to each of the pixels in a field-of-view of the digital image data bases captured by a nearest one of the camera lens 105, 107, 120, 122. For instance, the depth-detection sensor 140 can be configured to collect depth values corresponding to the pixels in images captured by the nearest camera lens 105, the depth-detection sensor 141 collects depth values corresponding to the pixels in images captured by the nearest camera lens 107, etc. . . .

Such depth-detection sensors 140, 141, 142 143 can be positioned as described above on both the front-side 202 and back-side 302 of the apparatus 100. In some embodiments, each of the separate depth-detection sensors includes, or is, a light detection and ranging (LIDAR) sensor, or, a radio detection and ranging sensor (RADAR) sensor, or, and ultrasonic detection and ranging sensor. One skilled in the pertinent arts would understand how to configure such sensors to emit signals (e.g., infrared or visible light, radio frequency pulses or sound wave signals), which can be reflected off of the surfaces of objects in the scene 102 back to the sensor to detect the reflected signals, which in turn, can be used to calculated a depth value for the part of an object's surface that the signals reflected off of and to relate that to depth values of a pixel or pixels in the digital image data bases 115, 117, 127, 129 representing that object's surface.

Other aspects of the invention include embodiments of a method of processing stereoscopic digital images of a scene, for presentation on a head mounted stereoscopic display unit and a system for processing such digital image data. FIG. 6 presents a flow diagram of example embodiments of a method 600 for processing such digital image data, including any of the digital image data collected by any of the apparatus embodiments depicted in FIGS. 1-5, according to the principles of the present invention.

FIG. 7 present a block diagram of an example embodiment of an electronic computing image processing system 700 for processing stereoscopic digital image data according to any of the embodiments of the method 600 such as described in the context of FIG. 6. As illustrated in FIG. 7, the system 700 includes an electronic computing device 705 (e.g., a desktop computer, laptop computer, personal digital assistant device, a mobile phone device, a television, etc. . . . ) having a graphical processing unit (GPU 710), a central processing unit (CPU 715), configured to process the image data bases (e.g., data bases 115, 117, 127, 129, FIG. 1) held in a data store 720 (e.g., RAM and other storage media similar to that discussed in the context of FIG. 1) according to the method 600. The GPU 710, CPU 715 and data store 720 can be in communication with each other via a communication bus (e.g., bus 725) of the system 700. Some embodiments of the system 700 can further include a head mounted stereoscopic display unit (HMDU 730) configured to display the virtual reality stereoscopic images processed according to the method 600. Images produced according to the method 600 can be sent via the bus 725 to the display unit 730 using wired or wireless communication protocols familiar to those skilled in the pertinent arts.

With continuing reference to FIGS. 1-7 throughout, the example method 600 includes, loading in step 605, from a data store (e.g., data store 720) of an electronic computing device (e.g., computing device 705), separate digital image data bases (e.g., data bases 115, 117, 127, 129) corresponding to a first pair of left-eye and right-eye horizontal views, and a second of left-eye and right-eye off-horizontal views.

The method 600 also includes selecting in step 610, in an electronic processing unit (e.g., one or both of GPU 710 and CPU 715), a blend of pixels from the first pair of left-eye and right-eye horizontal views and the second pair of left-eye and right-eye off-horizontal views. The blend is proportionate to the off-horizontal tilt angle (e.g., tilt angle 735) of the head mounted stereoscopic display unit 730.

The method 600 also includes morphing in step 615, in the electronic processing unit, the blend of the pixels of the left-eye horizontal view with the pixels of the left-eye off-horizontal view to produce a left-eye image for presentation on a left screen side (e.g., left screen 740) of the head mounted stereoscopic display unit 730, and, morphing also as part of step 615, the blend of the pixels of the right-eye horizontal view with the pixels of the right-eye off-horizontal view to produce a right-eye image for presentation on a right screen side (e.g., right screen 745) of the display unit 730.

Similar to that discussed in the context of the apparatus 100 depicted in FIGS. 1-3, in some embodiments of the method 600, the digital image data bases corresponding to the left-eye horizontal view and the right-eye horizontal view (e.g., data bases 115, 117, respectively) loaded in step 605 can be respectively captured, in step 620, by a first pair of separated camera lens (e.g., camera lens 105, 107) oriented such that a first imaginary line 110 between the first pair of lens 105, 107 is substantially parallel with a horizon line 112 in the scene 102. The digital image data bases corresponding to the left-eye off-horizontal view and the right-eye off-horizontal view (e.g., data bases 127, 129, respectively), can be respectively captured, as part of step 620, by a second pair of separated camera lens (e.g., camera lens 120, 122) oriented such that a second imaginary line 125 between the second pair of lens 120, 122 is substantially non-parallel with the horizon line 112.

Alternatively, in other embodiments of the method 600, the digital image data bases corresponding to the left-eye horizontal view and the right-eye horizontal view loaded in step 605 were respectively generated, in step 622, from a first pair of separated virtual camera lens oriented such that a first imaginary line between the first pair of lens is substantially parallel with the horizon line in the scene generated as a computer graphics-generated scene. The digital image data bases corresponding to the left-eye off-horizontal view and the right-eye off-horizontal view, were generated respectively, as part of step 622, from a second pair of separated virtual camera lens oriented such that a second imaginary line between the second pair of lens is substantially non-parallel with the horizon line in the computer graphics-generated scene. One skilled in the pertinent arts would be familiar with computer graphics rendering procedures to generate such artificial scenes as well as how to generate left-eye and right-eye views of such artificial scenes from the different perspectives of horizontally and off-horizontally positioned virtual camera lens.

In some embodiments, as part of step 610, the selected blend of pixels equals 100 percent of an intensity of the pixels of the second pair of left-eye and right-eye off-horizontal views and 0 percent of an intensity of the pixels of the first pair of left-eye and right-eye horizontal views. Such a blend is used when the head mount display unit off horizontal tilt angle 735 is substantially equal (e.g., within about ±1 degree) to an off-horizontal angle formed between a first imaginary line (e.g., line 110) between left-eye and right eye horizontal camera view image data bases (e.g., data bases 115 and 117 respectively) and a second imaginary line (e.g., line 125) between left-eye and right-eye off-horizontal camera view image data bases (e.g., data bases 127 and 129, respectively).

For example, when the tilt angle 735 is substantially equal to the 90 degree off-horizontal angle 265 of the apparatus 100 configured as depicted in FIG. 2, then the selected blend (step 610) equals 100 percent of an intensity of the pixels in the data bases 127, 129 (corresponding to the images captured from camera lens 120, 122) are selected, and, 0 percent of an intensity of pixels in data bases 115, 117 (corresponding to the images captured from camera lens 105, 107) are selected.

For example, when the tilt angle 735 is substantially equal to a 45 degree off-horizontal angle 425, or, the 45 degree off-horizontal angle 265, then the selected blend (step 610) equals 100 percent of an intensity of the pixels in the data bases 127, 129 (corresponding to the images captured from camera lens 120, 122) are selected and 0 percent of an intensity of pixels in data bases 115, 117 (corresponding to the images captured from camera lens 105, 107) are selected.

In other embodiments, if the tilt angle 735 is greater than zero, but less than the off-horizontal angle (e.g., less than angles 265, 425, depending of the configuration of the apparatus 100) then less than 100 percent of an intensity of the pixels in the data bases 127, 129 and greater than 0 percent of an intensity of pixels in data bases 115, 117 are selected as part of step 610.

For instance, consider embodiments where the tilt angle 735 is equal to $\theta 1$, the off-horizontal angle 265, 425, equals $\theta 2$, and $\theta 1$ is less than or equal to $\theta 2$. In such embodiments, the selected blend equals $100 \times \theta 1/\theta 2$ percent of an intensity of the pixels of second pair of rotated left-eye and right-eye off-horizontal views (e.g., data bases 127, 129) and $100 \times (\theta 2-\theta 1)/\theta 2$ percent of an intensity of the pixels of the first pair of left-eye and right-eye horizontal views (e.g., data bases 115, 117).

In some embodiments, morphing in step 615 includes a step 625 of producing separate depth map data bases. Each of the depth map data bases holding sets of depth values, D1, D2, D3, and D4, corresponding to each of the pixels of one of the first pair of left-eye and right-eye horizontal view data bases 115, 117 and the second pair of left-eye and right-eye off-horizontal view data bases 127, 129, respectively. As used herein the sets of depth values, D1, D2, D3, and D4 refer to pixel relative depths which range from an arbitrary maximum value (e.g., 100 arbitrary depth units) for those pixels that are associated with most distant objects in the scene 102, to a minimum value (e.g., 1 arbitrary depth units) for those pixels that are associate with most close objects in the scene 102.

In some embodiments, as part of step 625, producing the separate depth map data bases includes calculating in step 630, in the electronic processing unit, the depth values D1, D2, from an amount of location shift between corresponding pixels from the left-eye horizontal view data base 115 versus the right-eye horizontal view data base 117 and, calculating the depth values D3, D4, from an amount of location shift between corresponding pixels from the left-eye off-horizontal view data base 127 versus the right-eye off-horizontal view data base 129.

Alternatively, in some embodiments, as part of step 625, producing the separate depth map data bases includes retrieving in step 635, from the data store 720, depth values from a depth map data base collected from depth-detection sensors 140, 141, 142, 143 located nearby cameras lens (e.g., lens 105, 107, 120, 122) used to capture images stored in the first pair of left-eye and right-eye horizontal view data bases 115, 117 and the second pair of left-eye and right-eye off-horizontal view data bases 127, 129.

Morphing in step 615 can also include a step 640 of calculating, in the electronic processing unit, a weighted sum of intensities for each one of the pixels of the left-eye horizontal view data base 115 and a corresponding one the pixels of the left-eye off-horizontal view data base 127. The intensity of the pixels of left-eye horizontal view data base 115 have a weighting proportional to $(\theta 1/\theta 2)/D1$ and the intensity of the pixels of the left-eye off-horizontal view data base 127 have a weighting proportional to $((\theta 2-\theta 1)/\theta 2)/D3$.

Morphing in step 615 can also include a step 645 of calculating, in the electronic processing unit, a weighted sum of intensities for each one of the pixels of the right-eye horizontal view data base 107 and a corresponding one the pixels of the right-eye off-horizontal view data base 129. The intensity of the pixels of right-eye horizontal view data base 117 have a weighting proportional to $(\theta 1/\theta 2)/D2$ and the intensity of the pixels of the right-eye off-horizontal view data base 129 have a weighting proportional to $((\theta 2-\theta 1)/\theta 2)/D4$.

Those skilled in the art to which this application relates will appreciate that other and further additions, deletions, substitutions and modifications may be made to the described embodiments.

What is claimed is:

1. An apparatus for capturing stereoscopic digital images of a scene, comprising:
   a first pair of separated camera lenses oriented such that a first imaginary line between the first pair of lenses is substantially parallel with a horizon line in a scene;
   a second pair of separated camera lenses oriented such that a second imaginary line between the second pair of lenses is substantially non-parallel with the horizon line; and
   a third pair of separated camera lenses oriented such that a third imaginary line between the third pair of lenses is substantially non-parallel with the first line and the second line, wherein the first line, second line and the third line pass through a common center point.

2. The apparatus of claim 1, wherein the first pair of separated camera lenses are separated from each other along the first line by a fixed distance and the second pair of separated camera lenses are separated from each other along the second line by a same fixed distance.

3. The apparatus of claim 1, wherein the first pair of separated camera lenses, the second pair of separated camera lenses, and the third pair of separated camera lenses are located in a same plane that is substantially perpendicular to the horizon line, and at least one of the first imaginary line, the second imaginary line, and the third imaginary line corresponds to an off-horizontal tilt angle along the plane.

4. The apparatus of claim 1, wherein the first line and the second line pass through a common center point and the second line is substantially perpendicular to the first line.

5. The apparatus of claim 1, wherein:
a first segment of the second line is located between one of the second pair of lenses and a center point of the second line,
a first segment of the first line is located between one of the first pair of lenses and a center point of the first line, and
the first segment of the second line forms an off-horizontal angle of about +90 degrees with the first segment of the first line.

6. The apparatus of claim 5, wherein:
a second segment of the second line is located between the other one of the second pair of lenses and the center point of the second line,
a second segment of the first line is located between the other one of the first pair of lenses and the center point of the first line, and
the second segment of the second line forms another off-horizontal angle of about −90 degrees with the second segment of the first line.

7. The apparatus of claim 1, further including separate digital image databases for separately storing digital image data captured by the first, second or third pair of separated camera lenses as left eye views and right eye views.

8. The apparatus of claim 1, wherein:
a first segment of the second line located between one of the second pair of lenses and the center point, forms an about 90 degree off-horizontal angle with a first segment of the first line located between one of the first pair of lenses and the center point, and
a first segment of the third line located between one of the third pair of lenses and the center point, forms an about 45 degree off-horizontal angle with the same first segment of the first line.

9. The apparatus of claim 1, further including a fourth pair of separated camera lenses oriented such that a fourth imaginary line between the fourth pair of lenses is substantially non-parallel with the first line, the second line and the third line.

10. The apparatus of claim 9, wherein:
the first line, second line, the third line and the fourth line pass through a common center point,
a first segment of the second line located between one of the second pair of lenses and the center point, forms an about +90 degree off-horizontal angle with a first segment of the first line located between one of the first pair of lenses and the center point,
a first segment of the third line located between one of the third pair of lenses and the center point, forms an about +45 degree off-horizontal angle with the same first segment of the first line, and
a first segment of the fourth line located between one of the fourth pair of lenses and the center point, form an about −45 degree off-horizontal angle with the same first segment of the first line.

11. The apparatus of claim 1, wherein:
a first segment of the second line is located between one of the second pair of lenses and a center point of the second line,
a first segment of the first line is located between one of the first pair of lenses and a center point of the first line, and
the first segment of the second line forms an off-horizontal angle with the first segment of the first line, the off-horizontal angle in a range from about +20 to +70 degrees.

12. The apparatus of claim 1, further include separate depth-detection sensors near each one of the camera lenses of the first and second pairs of separated camera lenses, wherein the separate depth-detection sensors are configured to collect depth values corresponding to each of the pixels in a full field of view of the digital image data bases captured by the nearest one of the camera lenses.

13. A method of processing stereoscopic digital images of a scene, for presentation on a head mounted stereoscopic display unit, comprising:
loading, from a data store of an electronic computing device, separate digital image data bases of images corresponding to a first pair of left-eye and right-eye horizontal views captured from a first pair of separated camera lenses oriented such that a first imaginary line between the first pair of lenses is substantially parallel with a horizon line a scene, and a second pair of left-eye and right-eye off-horizontal views captured from a second pair of separated camera lenses oriented such that a second imaginary line between the second pair of lenses is substantially non-parallel with the horizon line;
selecting, in an electronic processing unit of the electronic computing device, a blend of pixels from the first pair of left-eye and right-eye horizontal views and the second pair of left-eye and right-eye off-horizontal views, wherein the blend is proportionate to an off-horizontal tilt angle of the head mounted stereoscopic display unit along a plane that is substantially perpendicular to the horizon line; and
morphing, in the electronic processing unit, the blend of the pixels of the left-eye horizontal view with the pixels of the left-eye off-horizontal view to produce a left-eye image for presentation on a left screen side of the head mounted stereoscopic display unit, and, morphing the blend of the pixels of the right-eye horizontal view with the pixels of the right-eye off-horizontal view to produce a right-eye image for presentation on a right screen side of the head mounted stereoscopic display unit.

14. The method recited in claim 13, wherein the digital image data bases corresponding to the left-eye horizontal view and the right-eye horizontal view were captured, respectively, by a first pair of separated camera lenses oriented such that a first imaginary line between the first pair of lenses is substantially parallel with a horizon line in the scene, and, the digital image data bases corresponding to the left-eye off-horizontal view and the right-eye off-horizontal view, were captured, respectively, by a second pair of separated camera lenses oriented such that a second imaginary line between the second pair of lenses is substantially non-parallel with the horizon line.

15. The method recited in claim 13, wherein the digital image data bases corresponding to the left-eye horizontal view and the right-eye horizontal view were generated, respectively, from a first pair of separated virtual camera lenses oriented such that a first imaginary line between the first pair of lenses is substantially parallel with the horizon line in the scene generated as a computer graphics-generated scene, and, the digital image data bases corresponding to the left-eye off-horizontal view and the right-eye off-horizontal view, were generated, respectively, from a second pair of separated virtual camera lenses oriented such that a second imaginary line between the second pair of lenses is substantially non-parallel with the horizon line in the computer graphics-generated scene.

16. The method recited in claim 13, wherein the selected blend equals 100×θ1/θ2 percent of an intensity of the pixels of second pair of rotated left-eye and right-eye off-horizontal views and 100×(θ2−θ1)/θ2 percent of an intensity of the pixels of the first pair of left-eye and right-eye horizontal views, when the tilt angle equals θ1, an off-horizontal angle, θ2, is formed between a first imaginary line between left-eye and right eye horizontal camera view image data bases and a second imaginary line between left-eye and right-eye off-horizontal camera view image data bases, and θ1 is less than or equal to θ2.

17. The method recited in claim 16, wherein the morphing includes:
- producing separate depth map data bases, each of the depth map data bases holding sets of depth values, D1, D2, D3, and D4, corresponding to each of the pixels of one of the first pair of left-eye and right-eye horizontal view data bases and the second pair of left-eye and right-eye off-horizontal view data bases, respectively;
- calculating a weighted sum of intensities for each one of the pixels of the left-eye horizontal view data base and a corresponding one the pixels of the left-eye off-horizontal view data base, wherein the intensity of the pixels of left-eye horizontal view data base have a weighting proportional to (θ1/θ2)/D1 and the intensity of the pixels of the left-eye off-horizontal view data base have a weighting proportional to ((θ2−θ1)/θ2)/D3); and
- calculating a weighted sum of intensities for each one of the pixels of the right-eye horizontal view data base and a corresponding one the pixels of the right-eye off-horizontal view data base, wherein the intensity of the pixels of right-eye horizontal view data base have a weighting proportional to (θ1/θ2)/D2 and the intensity of the pixels of the right-eye off-horizontal view data base have a weighting proportional to ((θ2−θ1)/θ2)/D4).

18. The method recited in claim 17, wherein producing the separate depth map data bases includes calculating, in the electronic processing unit, the depth values from an amount of location shift between corresponding pixels from the left-eye horizontal view data base versus the right-eye horizontal view data base, and, calculating the depth values from an amount of location shift between corresponding pixels from the left-eye off-horizontal view data base versus the right-eye off-horizontal view data base.

19. The method recited in claim 17, wherein producing the separate depth map data bases includes retrieving, from the data store, depth values from a depth map data base collected from depth-detection sensors located nearby camera lenses used to capture images stored in the first pair of left-eye and right-eye horizontal view data bases and the second pair of left-eye and right-eye off-horizontal view data bases.

20. An electronic computing image processing system for processing stereoscopic digital images of a scene, comprising:
- an electronic computing device, the electronic computing device including:
  - a data store configured to hold separate digital image data bases of images corresponding to a first pair of left-eye and right-eye horizontal views captured from a first pair of separated camera lenses oriented such that a first imaginary line between the first pair of lenses is substantially parallel with a horizon line a scene, and a second pair of left-eye and right-eye off-horizontal views captured from a second pair of separated camera lenses oriented such that a second imaginary line between the second pair of lenses is substantially non-parallel with the horizon line; and
  - graphical processing and central processing units configured to:
    - select a blend of pixels from the first pair of left-eye and right-eye horizontal views and the second pair of left-eye and right-eye off-horizontal views, wherein the blend is proportionate to an off-horizontal tilt angle of a head mounted stereoscopic display unit along a plane that is substantially perpendicular to the horizon line; and
    - morph the blend of the pixels of the left-eye horizontal view with the pixels of the left-eye off-horizontal view to produce a left-eye image for presentation on a left screen side of the head mounted stereoscopic display unit, and, morph the blend of the pixels of the right-eye horizontal view with the pixels of the right-eye off-horizontal view to produce a right-eye image for presentation on a right screen side of the head mounted stereoscopic display unit.

\* \* \* \* \*